(12) United States Patent
Collinson et al.

(10) Patent No.: US 10,776,619 B2
(45) Date of Patent: Sep. 15, 2020

(54) SYSTEMS AND METHODS FOR AUGMENTING A DISPLAYED DOCUMENT

(71) Applicant: The Toronto-Dominion Bank, Toronto (CA)

(72) Inventors: John Michael Collinson, Kitchener (CA); Christopher William Cooney, Toronto (CA); Russell Voutour, Toronto (CA); Marie-Julie Demers, Saint-Lambert (CA); Arun Victor Jagga, Toronto (CA); John Jong-Suk Lee, Toronto (CA)

(73) Assignee: The Toronto-Dominion Bank, Toronto, ON (CA)

( * ) Notice: Subject to any disclaimer, the term of this patent is extended or adjusted under 35 U.S.C. 154(b) by 71 days.

(21) Appl. No.: 16/143,791

(22) Filed: Sep. 27, 2018

(65) Prior Publication Data
US 2020/0104585 A1     Apr. 2, 2020

(51) Int. Cl.
*G06N 20/00*     (2019.01)
*G06K 9/00*     (2006.01)
(Continued)

(52) U.S. Cl.
CPC .......... *G06K 9/00456* (2013.01); *G06F 7/50* (2013.01); *G06F 16/34* (2019.01); *G06F 40/186* (2020.01); *G06N 20/00* (2019.01)

(58) Field of Classification Search
CPC ....... G06F 7/50; G06K 9/00456; G06N 20/00
See application file for complete search history.

(56) References Cited

U.S. PATENT DOCUMENTS 8,704,948 B2 * 4/2014 Mountain ........ H04N 21/44008
                                                      348/564
8,890,896 B1   11/2014   Tseng
(Continued)

FOREIGN PATENT DOCUMENTS

WO     2017041187 A1     3/2017

OTHER PUBLICATIONS

Wither et al.: "Annotation in outdoor augmented reality", Computers & Graphics, vol. 33, Issue 6, Dec. 2009, pp. 679-689.
(Continued)

*Primary Examiner* — Maikhanh Nguyen
(74) *Attorney, Agent, or Firm* — Rowand LLP

(57) ABSTRACT

There may be provided a processor-implemented method of causing annotation data to be overlaid on a viewport. The method may include: receiving a signal comprising image data, the image data representing a first document; performing optical character recognition on the image data to identify text in the first document; automatically analyzing the text based on stored classification data to identify a first parameter associated with the first document; comparing the first parameter to a second parameter, the second parameter being obtained from a data store and being associated with a second document; determining annotation data based on the comparison, the annotation data determined based on the first parameter and the second parameter; and providing a signal that includes an instruction to cause the annotation data to be overlaid on a viewport displaying a real-time image of the first document.

17 Claims, 9 Drawing Sheets

(51) Int. Cl.
*G06F 7/50* (2006.01)
*G06F 16/34* (2019.01)
*G06F 40/186* (2020.01)

(56) References Cited

U.S. PATENT DOCUMENTS

| | | | |
|---|---|---|---|
| 9,007,364 B2 | 4/2015 | Bailey | |
| 9,503,681 B1* | 11/2016 | Popescu | G16H 80/00 |
| 9,589,372 B1* | 3/2017 | Bean | G06T 3/20 |
| 9,685,001 B2 | 6/2017 | Pasquero et al. | |
| 9,721,394 B2 | 8/2017 | Rosenthal et al. | |
| 10,178,246 B1* | 1/2019 | Horvath | H04N 1/32106 |
| 10,438,206 B2* | 10/2019 | Jivraj | G06Q 20/322 |
| 10,474,890 B2* | 11/2019 | Hassanzadeh | G06T 15/20 |
| 2009/0059094 A1* | 3/2009 | Yi | G09B 5/06 |
| | | | 348/744 |
| 2009/0271715 A1* | 10/2009 | Tumuluri | H04N 7/17318 |
| | | | 715/757 |
| 2011/0320317 A1* | 12/2011 | Yuan | G06Q 30/0601 |
| | | | 705/26.61 |
| 2012/0062596 A1* | 3/2012 | Bedi | G06Q 30/0256 |
| | | | 345/633 |
| 2012/0218444 A1* | 8/2012 | Stach | G06T 1/0021 |
| | | | 348/241 |
| 2013/0260727 A1* | 10/2013 | Knudson | G06Q 30/00 |
| | | | 455/414.1 |
| 2013/0311868 A1 | 11/2013 | Monney et al. | |
| 2014/0002643 A1 | 1/2014 | Aziz et al. | |
| 2014/0028716 A1 | 1/2014 | Yeh | |
| 2014/0253743 A1* | 9/2014 | Loxam | G06T 11/60 |
| | | | 348/207.1 |
| 2015/0169525 A1 | 6/2015 | Palm et al. | |
| 2016/0049010 A1 | 2/2016 | Hinski | |
| 2016/0171622 A1 | 6/2016 | Perkins et al. | |
| 2016/0203648 A1 | 7/2016 | Bilbrey et al. | |
| 2016/0358383 A1* | 12/2016 | Gauglitz | G06T 19/006 |
| 2017/0032481 A1* | 2/2017 | D'Souza | G06K 9/46 |
| 2017/0220886 A1 | 8/2017 | Canero Morales et al. | |
| 2019/0019021 A1* | 1/2019 | Hassanzadeh | G06K 9/66 |

OTHER PUBLICATIONS

Langlotz et al.: "Online Creation of Panoramic Augmented Reality Annotations on Mobile Phones" Published in: IEEE Pervasive Computing (vol. 11, Issue: 2, Feb. 2012 ).

* cited by examiner

SYSTEMS AND METHODS FOR AUGMENTING A DISPLAYED DOCUMENT

TECHNICAL FIELD

The present application relates to augmented reality displays and, more particularly, to automatically annotating documents displayed on augmented reality devices.

BACKGROUND

Documents such as legal documents are often lengthy and are difficult for a user to understand. For example, consumers often receive policy documents such as insurance policy documents and may find such documents difficult to comprehend. Consequently, consumers often fail to adequately review such documents.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
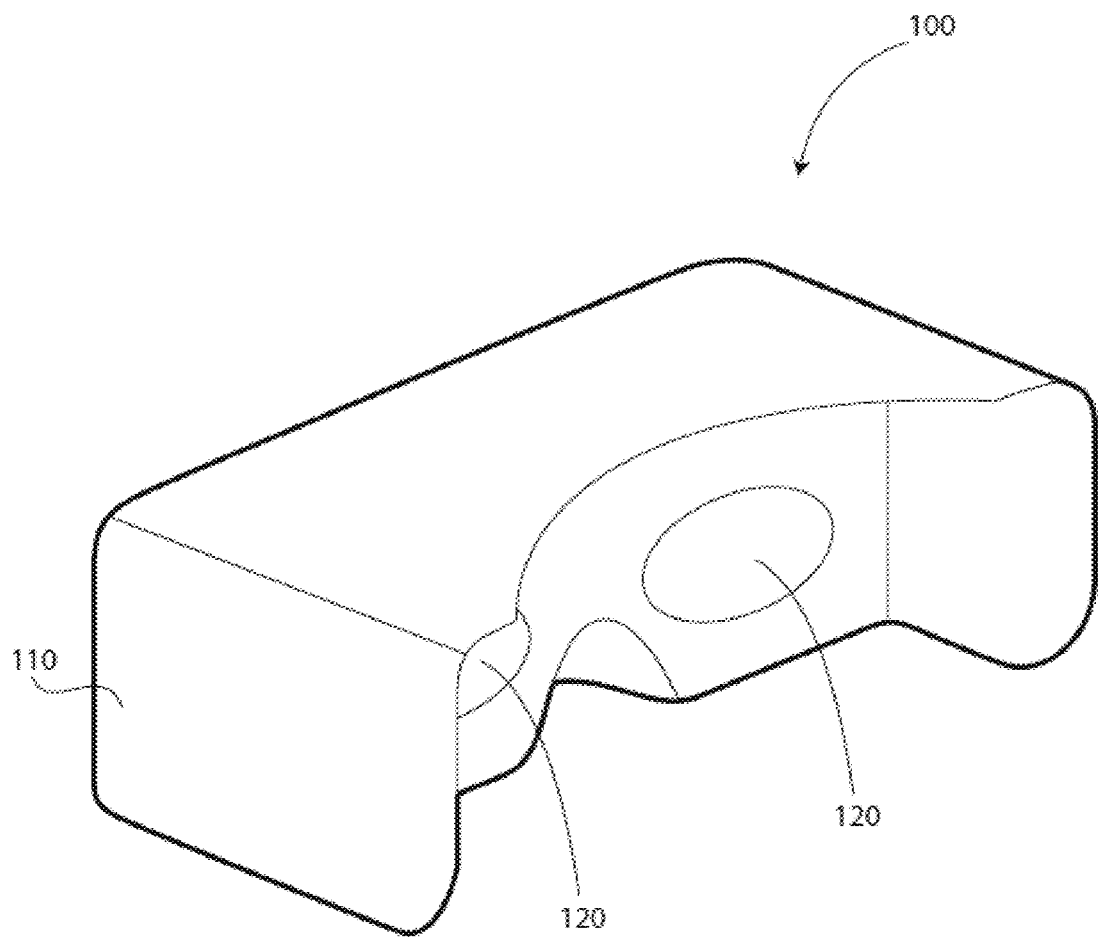
FIG. 1 shows an augmented reality device, exemplary of an embodiment.

According to the subject matter of the present application, there may be provided a processor-implemented method of causing annotation data to be overlaid on a viewport. The method may include: receiving a signal comprising image data, the image data representing a first document; performing optical character recognition on the image data to identify text in the first document; automatically analyzing the text based on stored classification data to identify a first parameter associated with the first document; comparing the first parameter to a second parameter, the second parameter being obtained from a data store and being associated with a second document; determining annotation data based on the comparison, the annotation data determined based on the first parameter and the second parameter; and providing a signal that includes an instruction to cause the annotation data to be overlaid on a viewport displaying a real-time image of the first document.

According to the subject matter of the present application, there may be provided a computing device configured to perform a method described herein. Such a computing device may include a communications module, a processor coupled to the communications module and a memory coupled to the processor. The memory may store processor-executable instructions which, when executed, configure the processor to perform a method described herein.

In a particular example, there may be provided a computing device including a communications module, a processor coupled to the communications module and a memory coupled to the processor. The memory may store processor-executable instructions which, when executed, configure the processor to: receive, via the communications module, a signal comprising image data from an augmented reality device, the image data representing a first document; perform optical character recognition on the image data to identify text in the first document; automatically analyze the text based on stored classification data to identify a first parameter associated with the first document; compare the first parameter to a second parameter, the second parameter being obtained from a data store and being associated with a second document; determine annotation data based on the comparison, the annotation data determined based on the first parameter and the second parameter; and provide, to the augmented reality device via the communications module, a signal that includes an instruction to cause the annotation data to be overlaid on a viewport displaying a real-time image of the first document.

According to the subject matter of the present application, there may be provided a non-transitory processor-readable storage medium storing instructions that, when executed by a processor of a computing device cause the computer system to perform a method described herein.

In a particular example, there may be provided non-transitory computer-readable storage medium storing instructions that, when executed by a processor of a computing device cause the computing device to: receive a signal comprising image data from an augmented reality device, the image data representing a first document; perform optical character recognition on the image data to identify text in the first document; automatically analyze the text based on stored classification data to identify a first parameter associated with the first document; compare the first parameter to a second parameter, the second parameter being obtained from a data store and being associated with a second document; determine annotation data based on the comparison, the annotation data determined based on the first parameter and the second parameter; and provide, to the augmented reality device, a signal that includes an instruction to cause the annotation data to be overlaid on a viewport displaying a real-time image of the first document.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

According to the subject matter of the present application, an augmented reality display of a document may be provided. The augmented reality display may be provided on an augmented reality device. The augmented reality device is an electronic device and, more particularly, is a computing device, having a viewport, such as a display, and a camera. The augmented reality device may take various forms. For example, FIG. 1 shows a wearable augmented reality device 100, exemplary of an embodiment.

The wearable augmented reality device 100 includes a body 110. The body 110 is shaped so as to allow a viewer to hold it up against their face above their nose such as in manners similar to holding a pair of goggles against one's face.

The wearable augmented reality device 100 includes a pair of viewports 120. A viewer may look through the viewports 120 with their eyes to view one or more internal displays (not shown) of the wearable augmented reality device 100. The viewports 120 may include lenses that may, for example, assist the viewer in focusing on the display. The spacing of the viewports 120 provides a separate view for each of the eyes of the viewer so as to provide for a stereoscopic separation, thereby allowing the viewer to experience a three-dimensional augmented reality environment.

The wearable augmented reality device 100 may include one or more cameras (not illustrated in FIG. 1). Where stereoscopic viewing is provided, the augmented reality device 100 may include a left-eye camera and a right-eye camera. The left-eye camera may generate camera data that is used within a left-eye viewport and the right-eye camera may generate camera data that is used within a right-eye viewport.

The augmented reality device 100 may take other forms apart from that illustrated in FIG. 1. For example, the augmented reality device 100 may not be head-mounted. The augmented reality device 100 may be a portable electronic device, such as a smartphone or tablet having a rear-facing camera and a front-facing display.

Figure 2:
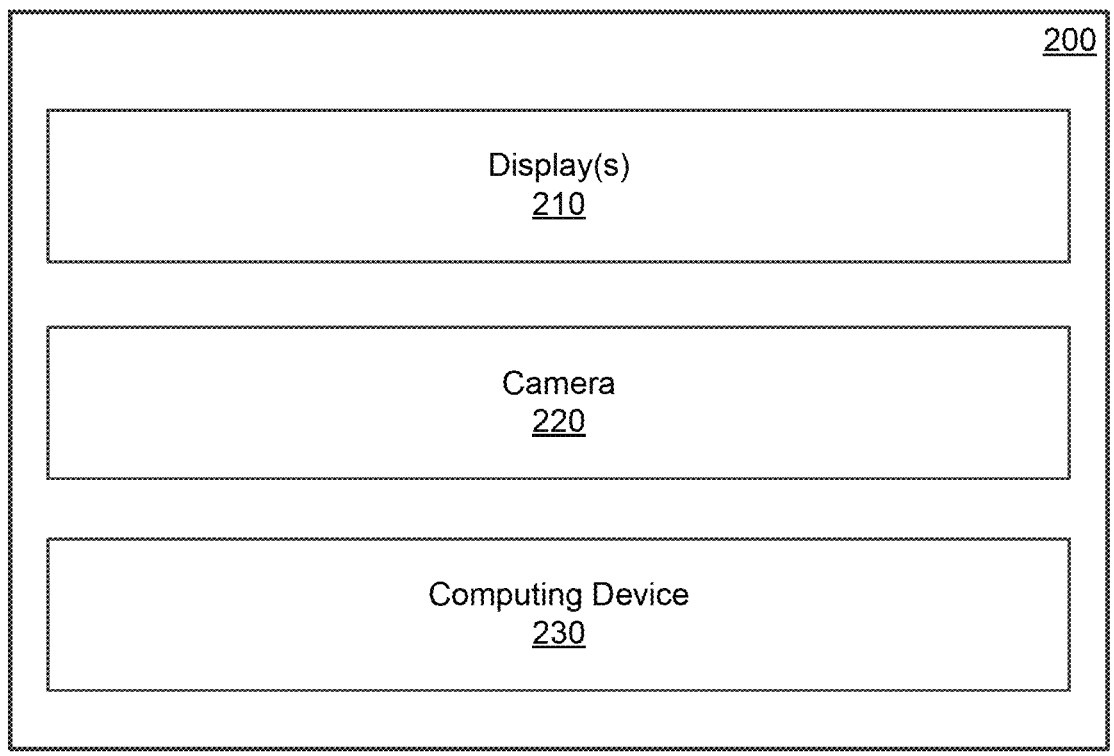
FIG. 2 is a simplified schematic diagram showing components of an augmented reality system.

FIG. 2 is a simplified schematic diagram showing components of an augmented reality system 200.

The augmented reality system 200 may, as shown, include one or more displays 210, a camera 220 and a computing device 230. The one or more displays 210 act as a viewport and are used to display an augmented reality display to a viewer. The augmented reality display may be a three dimensional display or a two-dimensional display. In some embodiments, the one or more displays 210 may correspond to an internal display of an augmented reality device such as, for example, the wearable augmented reality device 100 (FIG. 1).

The camera 220 is an image sensor which generates a signal that includes image data. The camera 220 may be a rear-facing camera, for example. A rear-facing camera is a camera that is directed at a side of the augmented reality device 100 that is opposite the display.

The computing device 230 is in communication with the one or more displays 210 and the camera 220. The computing device 230 may render the two or three-dimensional virtual environment presented to a viewer via the one or more displays 210. More particularly, the computing device 230 may render portions of the augmented reality display to a viewer for presentation via the one or more displays 210.

In some embodiments, each of the components of the augmented reality system 200 may be mounted or integrated into a augmented reality device such as, for example, the wearable augmented reality device 100 (FIG. 1). Alternatively, it may be that components such as, for example, the one or more displays 210 and the camera 220 are integrated into the augmented reality device 100, while others of the components such as, for example, the computing device 230 may be separately housed with the different components communicating via some communications link such as, for example, via wired or wireless connection(s) there between.

Figure 3:
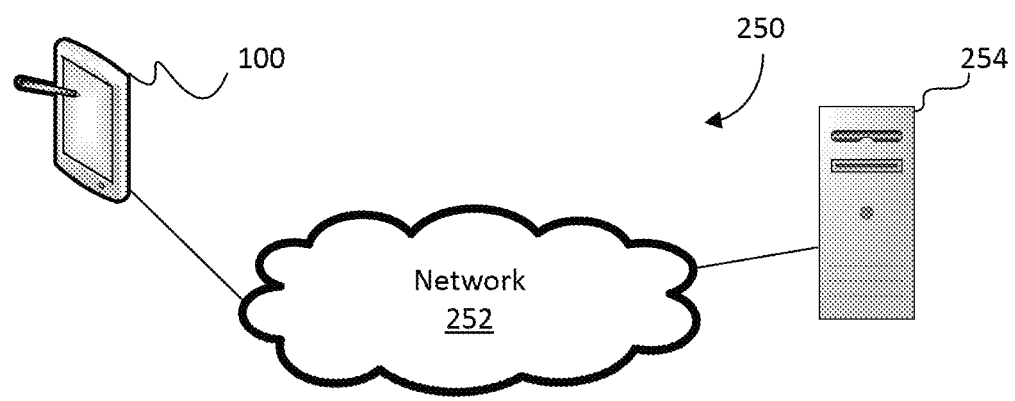
FIG. 3 is a block diagram of an example system.

Referring now to FIG. 3, an example system 250 is illustrated. The example system 250 includes an augmented reality device 100, a network 252 and a server 254. The augmented reality device 100 is connected to the server 254 through the network 252. The network 252 may include public and/or private networks including, for example, the Internet.

The server 254 is a computing device which provides back-end support to the augmented reality device 100. The server 254 may be referred to as an augmented reality server or a document annotation server.

Figure 4:
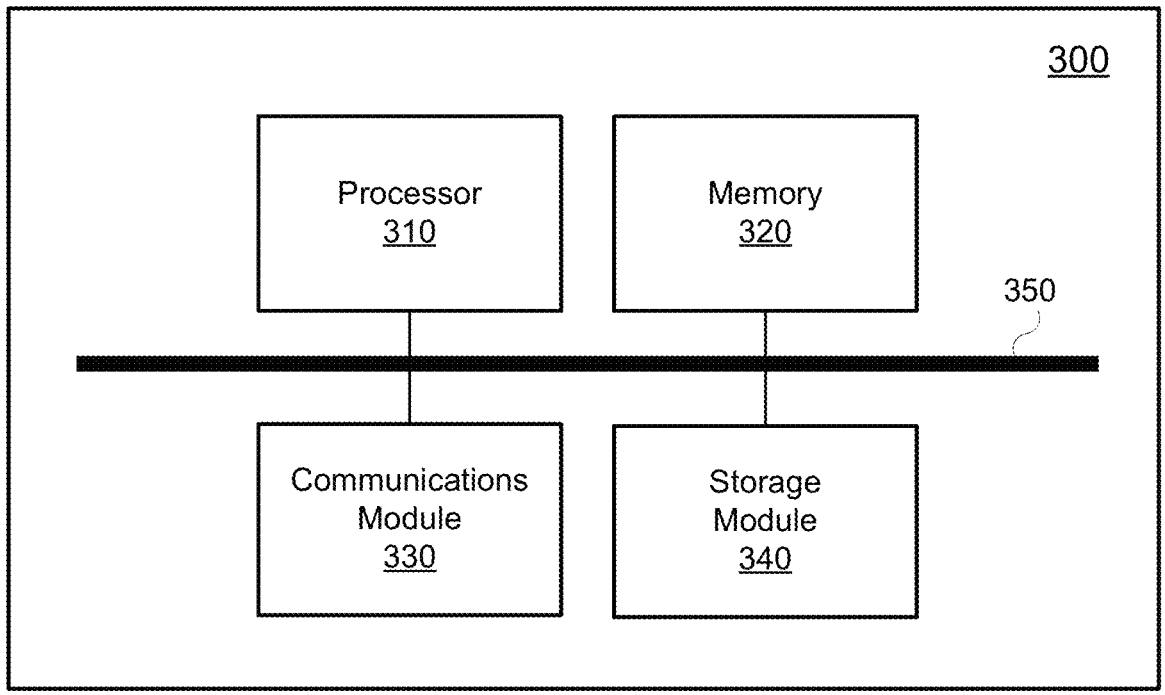
FIG. 4 is high-level schematic diagram of an example computing device.

FIG. 4 is a high-level operation diagram of an example computing device 300. In some embodiments, the example computing device 300 may be exemplary of the computing device 230 (FIG. 2) associated with the augmented reality device 100 or of the server 254. As will be discussed in greater detail below, the computing device 230 (FIG. 2) includes software that adapts to the augmented reality device 100 or server 254 to perform functions including functions generally described herein.

The example computing device 300 includes a variety of modules. For example, as illustrated, the example computing device 300 may include a processor 310, a memory 320, a communications module 330, and/or a storage module 340. As illustrated, the foregoing example modules of the example computing device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 300.

The communications module 330 allows the example computing device 300 to communicate with other computing devices and/or various communications networks. For example, the communications module 330 may allow the example computing device 300 to send or receive communications signals. Communications signals may be sent or received according to one or more protocols or according to one or more standards. For example, the communications module 330 may allow the example computing device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computing device 300 to communicate using near-field communication (NFC), via Wi-Fi™, using Bluetooth™ or via some combination of one or more networks or protocols. In some embodiments, all or a portion of the communications module 330 may be integrated into a component of the example computing device 300.

The storage module 340 allows data associated with the example computing device 300 to be stored and retrieved. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 5:
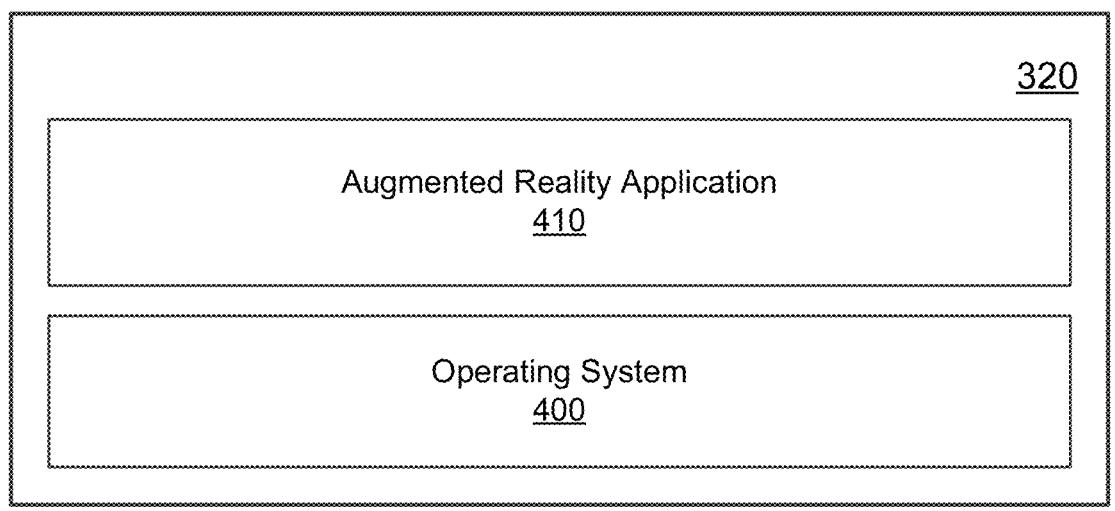
FIG. 5 shows a simplified organization of software components stored in a memory of the example computer device of FIG. 4 provided in augmented reality device.

FIG. 5 depicts a simplified organization of software components stored in the memory 320 of an example computing device 300 (FIG. 4) provided in an augmented reality system 200 of an augmented reality device 100.

As illustrated, these software components include an operating system 400 and an augmented reality application 410.

The operating system 400 is software. The operating system 400 allows the augmented reality application 410 to access the processor 310 (FIG. 4), the memory 320, and the communications module 330 of the example computing device 300 (FIG. 4). The operating system 400 may be, for example, Google™ Android™, Apple™ iOS™, UNIX™, Linux™, Microsoft™ Windows™, Apple OSX™ or the like.

The augmented reality application 410 adapts the example computing device 300 (FIG. 4), in combination with the operating system 400, to operate as a device to provide an augmented reality display and, in particular, to provide an augmented reality display of a document that includes annotation data overlaid thereon. In a particular example, the augmented reality application 410 may cooperate with the operating system 400 to adapt a suitable embodiment of the example computing device 300 (FIG. 4) to operate as the computing device 230 (FIG. 2) of the augmented reality system 200 (FIG. 2).

Figure 6:
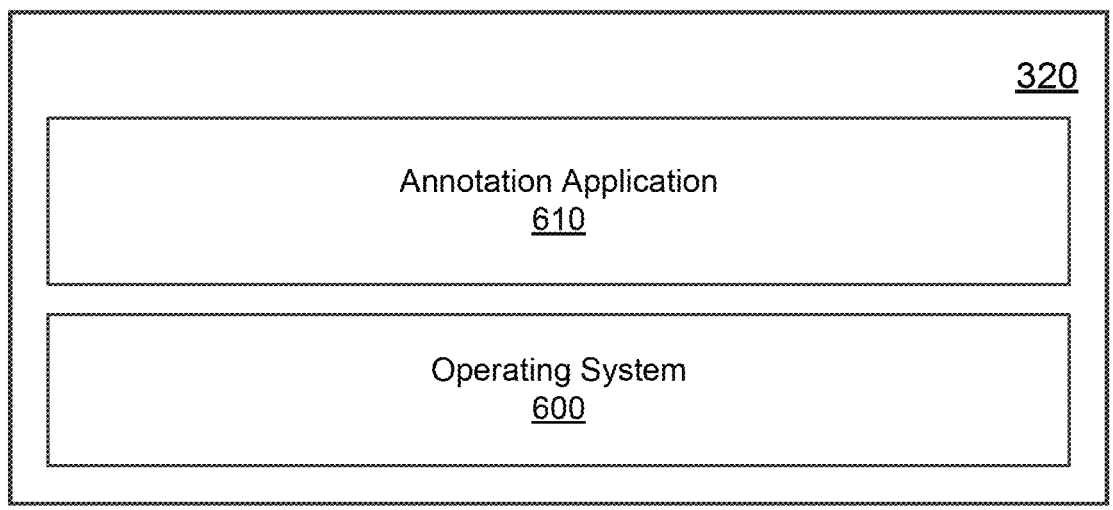
FIG. 6 shows a simplified organization of software components stored in a memory of the example computer device of FIG. 4 operating as a server.

FIG. 6 depicts a simplified organization of software components stored in the memory 320 of an example server 254. As illustrated, these software components include an operating system 600 and an annotation application 610.

The operating system 600 is software. The operating system 600 allows the annotation application 610 to access the processor 310 (FIG. 4), the memory 320, and the communications module 330 of the example computing device 300 (FIG. 4).

The annotation application 610 adapts the example computing device 300 (FIG. 4), in combination with the operating system 600, to generate annotation data and provide such data to an augmented reality device to cause the annotation data to be used to generate an augmented reality view of a document. The annotation application 610 may include a plurality of modules such as, for example, a machine learning module, a template-based analysis module and/or an optimal character recognition module.

In a particular example, the annotation application 610 may cooperate with the operating system 600 to adapt a suitable embodiment of the example computing device 300 (FIG. 4) to operate as the server 254.

Figure 7:
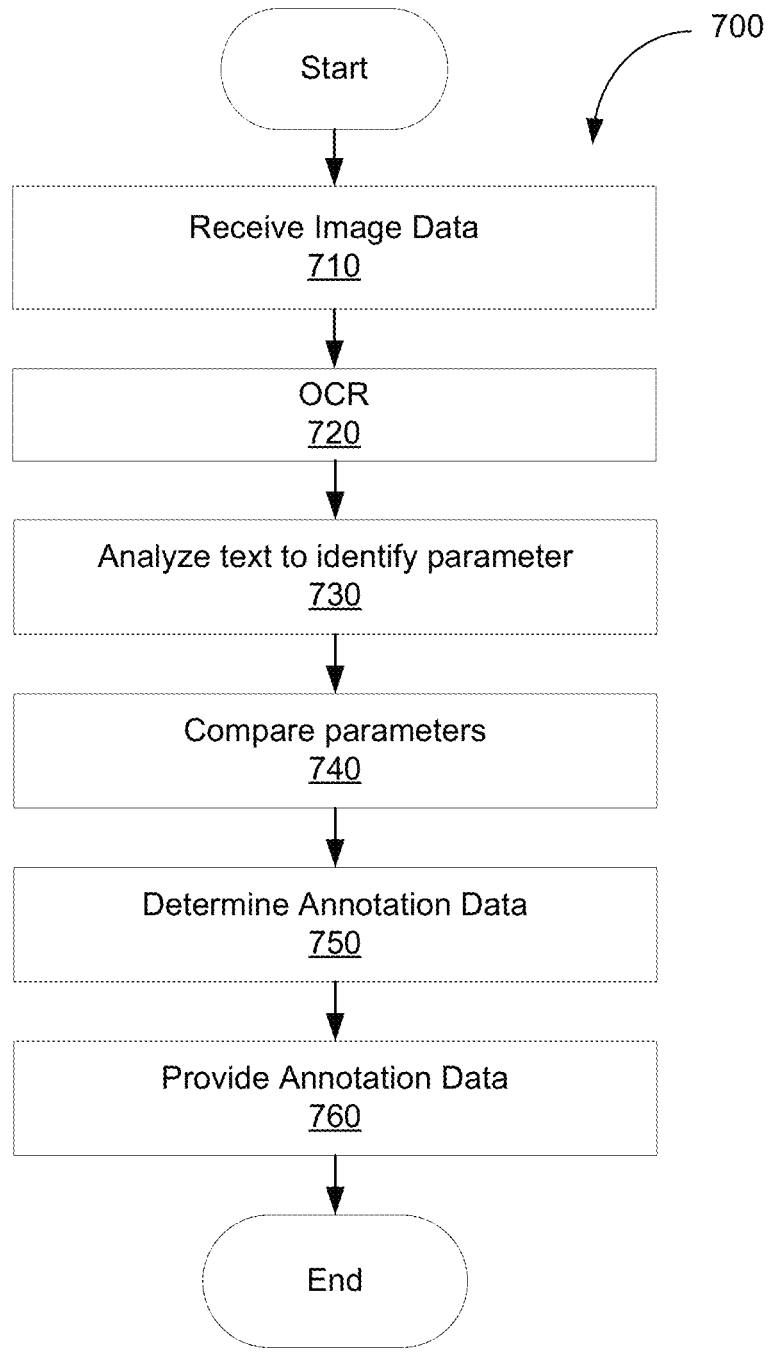
FIG. 7 is a flowchart of a method of causing annotation data to be overlaid on a viewport.

Referring now to FIG. 7, a method 700 of causing annotation data to be overlaid on a viewport is illustrated in flowchart form. Operations of the method 700 may be performed by a computing device such as the server 254. For example, a memory associated with such a computing device may store processor-executable instructions which adapt the computing device to perform the method 700 or portions of the method. For example, the annotation application 610 (FIG. 6) may include such instructions.

Accordingly, operations 710 and onward are performed by one or more processors of the computing device 300 (FIG. 4), such as for example the processor 310 (FIG. 4) of a suitably configured instance of the server 254 (FIG. 3), executing software such as, for example, a suitable instance of the annotation application 610 (FIG. 6).

At operation 710, the computing device 300 receives image data. For example, the computing device 300 may receive, via the communications module, a signal that includes image data from the augmented reality device 100. The image data may represent a document, which may be referred to as a first document. The first document may be a policy document and/or a legal document. The first document may, for example, be an insurance policy document which identifies one or more terms, clauses or conditions associated with an insurance policy. For example, the first document may reflect terms and conditions of a proposed policy, such as terms of a new automobile, health, life or housing insurance policy.

The signal that includes the image data may be received while the augmented reality device 100 is operating in an augmented reality mode which may be provided by the augmented reality application 410 (FIG. 5). The augmented reality mode may cause the augmented reality device 100 to repeatedly capture image data using the camera(s) 220 and repeatedly send signals representing such image data to the server 254. The signal that includes the image data may be received from an augmented reality device of a type described above including, for example, a wearable augmented reality device such as the headset illustrated in FIG. 1, or a handheld augmented reality device such as a smartphone or tablet computer, or an augmented reality device of another type.

In some instances, the image data may be processed to facilitate further operations of the method 700. For example, since the image data of any one image may not reflect a complete document, in some instances the computing device 300 may perform stitching based on multiple images in order to determine a more complete representation of the first document. In some instances, the computing device 300 may parse the image data into a plurality of segments by automatically evaluating a geometric structure of the first document represented in the image data. For example, the computing device 300 may identify whitespace having predefined characteristics in order to separate the image into sections or segments. For example, whitespace that is determined to represent carriage returns or indentations may be used to identify paragraphs of the document and the image data may be separated into paragraphs.

At operation 720, text recognition is performed based on the image data. For example, the image data or a portion thereof (such as a section or segment) may be analyzed to identify text contained therein. For example, optical character recognition may be performed on the image data to identify text in the first document.

In some embodiments, the text obtained at operation 720 may be further processed. For example, in some instances, the stitching described above may not be performed on the image and may, instead, be performed on the text itself. That is, text obtained from multiple images may be analyzed in order to prepare a more fulsome version of the text of the first document. Additionally or alternatively, segmentation operations may be performed based on the analyzed text. By way of further example, where the document is a policy document such as a legal document, paragraph or clause numbers may be used to separate the document into sections or segments to facilitate the analysis operations described below.

Control flow next proceeds to operation 730 where the text is automatically analyzed based on stored classification data. The text that is analyzed may be the text obtained from operation 720 or the further-processed version of such text; such as a selection section or segment.

During operation 730, the text is analyzed to identify a first parameter associated with the first document. The first parameter may, for example, be a numerical value. By way of example, the first parameter may be one of a deductible or a coverage limit. The analysis may be performed, for example, using template-based analysis techniques, machine-learning techniques, or both. For example, in some embodiments, the computing device may be configured to recognize a limited set of documents. That is, the computing device may only recognize known types of documents. By way of example, where the document represents an insurance policy, the computing device may be configured to recognize only a limited set of insurance policy documents. The set may be limited, for example, since insurance policy documents often include standard language and each insurer may use only a limited set of insurance policy documents.

The computing device may have access to classification data, which may be stored locally or remotely, which defines a plurality of templates. For example, each template may specify one or more words, word combinations, phrases, or sentences that are located near a parameter that is to be identified. For example, a template may specify a word combination that immediately precedes a parameter for a certain known type of document. For example, the template may specify that the parameter is located following "Your deductible will be". The computing device may then identify the first parameter by identifying the word combination.

In some instances, the template-based analysis may be a multi-stage analysis. For example, the computing device 300 may first analyze the text or the image data to determine a type associated with the first document. The type may be determined, for example, based on word combinations, phrases, sentences, logos, etc. that are known to be contained in a known type of document and that are not included in other known types of documents. Once identified, the type may be used to identify a template that is to be used to analyze the document and the first parameter may be determined using the text and the identified template. For example, the computing device 300 may recognize that only one known template includes the sentence "However, note that a decrease in your deductible, if available, will result in an increase in premiums." Upon identifying this sentence in the text, the computing device may select a template that is associated with the document type that includes the identified sentence and may use this template to identify the first parameter. For example, the template may specify that the first parameter is located following "Your deductible will be".

A machine learning module may be used by the computing device 300 at operation 730 to identify the first parameter. The machine learning module may have been trained to identify the first parameter. For example, the machine learning module may have been trained with a set of documents and known parameters specified in such documents. For example, the training set may have included a plurality of documents and a deductible (or other first parameter) contained in the text of such documents. Accordingly, in some embodiments at operation 730, the computing device may pass at least a portion of the text through a machine learning module that has been trained to identify one or more parameters including the first parameter. The machine learning module outputs the first parameter based on the text.

Figure 8:
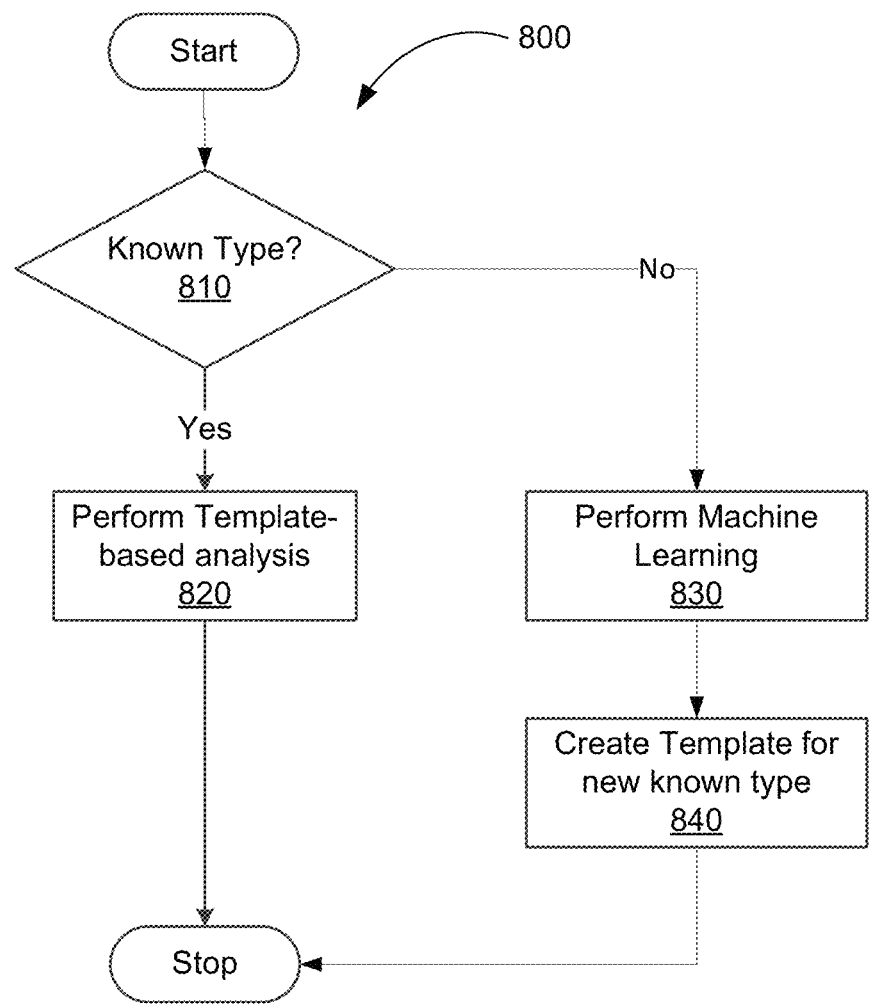
FIG. 8 is a flowchart of a method of analyzing text to identify a parameter.

In some instances, template-based and machine-learning techniques may be used in combination in order to identify the first parameter. For example, referring briefly to FIG. 8, an example method 800 is illustrated. The method 800 may be performed by the computing device 300 at operation 730 of the method 700 of FIG. 7.

At operation 810, the computing device 300 determines whether the first document corresponds to a known type. This determination may be performed as described above. For example, word combinations, phrases, sentences, etc. in the text may be analyzed to determine whether they are associated with a known type of document.

If it is determined that the first document does not correspond to a known type, machine learning may be performed at operation 830 in the manner described above to identify the first parameter. In some instances, a template may also be created based on the text and stored (at operation 840) so that future instances of documents having a type that is the same as the first document can be analyzed using template-based techniques. For example, the template may be defined to specify a technique by which the first parameter may be located; for example, by defining nearby words or word combinations. Unique identification data associated with the document type may also be stored so that the computing device may subsequently identify other documents of the same type. For example, unique word combinations, phrases, sentences, etc. may be stored.

If, however, it is determined that the first document corresponds to a known type, template-based analysis techniques of the type described above may be performed at operation 820 to identify the first parameter.

Returning again to FIG. 7, after the first parameter is identified, control flow may proceed to operation 740. At operation 740, the first parameter is compared to a second parameter. The second parameter may be obtained from a data store, which may be provided locally or remotely from the computing device 300. The second parameter is associated with a second document. The second parameter may be of the same type as the first parameter. For example, where the first parameter is a deductible, the second parameter may also be a deductible. By way of further example, where the first parameter is a coverage limit, the second parameter may also be a coverage limit. In some instances, the second parameter may represent text associated with a prior version of the first document. That is, the second document may be a previous version of the first document. For example, the first document may be a proposed or current policy document and the second parameter may be associated with a previous policy in effect. The first document may, for example, represent an insurance policy renewal and the second document may represent a previous insurance policy.

The comparison at operation 740 may involve determining whether the first parameter and the second parameter are different. For example, the computing device 300 may be configured to identify differences between two documents and to provide annotation data to highlight such differences. In some embodiments, if the first parameter and the second parameter are the same, then no annotation data will be generated based on the first parameter and the second parameter (i.e., operations 750 and 760 may not be performed based on the first parameter and second parameter). In other embodiments, annotation data may be generated even when the first parameter and the second parameter have not changed. Such annotation data may, for example, highlight the fact that there has been no change.

In at least some embodiments, at operation 740, the comparing of the first parameter to the second parameter may include performing a mathematical operation on the first parameter and the second parameter. For example, subtraction may be performed to determine the difference between the first parameter and the second parameter. This operation may determine whether the first parameter is greater than or less than the second parameter and the amount of the difference between these two parameters. For example, if the first parameter represents a deductible of $700 and the second parameter represents a deductible of $500, the computing device 300 may determine that the new deductible as represented in the first document is $200 more than the previous deductible as represented in the second document.

Next, at operation 750, the computing device determines annotation data based on the comparison that was performed at operation 740. The annotation data may include any one or combination of: the first parameter, the second parameter, a difference between the first parameter and the second parameter, an indication of whether the first parameter is greater than the second parameter, an indication of whether the second parameter is greater than the first parameter, and/or a percentage change between the first parameter and the second parameter. The annotation data may also include text that is selected based on one or more predefined rules. For example, appropriate text may be retrieved from memory based on the comparison and the text may differ based on the result of the comparison. By way of example, following are a few examples of possible annotation data: "Your deductible has decreased by 10%" (which may be used when the comparison suggests that the first parameter is less than the second parameter), "Your deductible has increased by $100" (which may be used when the comparison suggests that the first parameter is greater than the second parameter), or "Your deductible is the same" (which may be used when the comparison suggests that the first parameter is the same as the second parameter).

In some embodiments, the annotation data may include the first parameter and the second parameter. For example, the annotation data may specify an old value and a new value (e.g., "Old deductible: $500>New deductible: $300").

The computing device 300 may also generate marker data for the annotation data. The marker data may identify a location associated with the first document. The marker data may, for example, be text such as the first parameter.

After annotation data is determined, control flow proceeds to operation 760. At operation 760, the computing device 300 provides, to the augmented reality device 100 via the communications module, a signal that includes an instruction to cause the annotation data to be overlaid on a viewport displaying a real-time image of the first document. The viewport may, for example, be a display which operates in an augmented reality mode in which the annotation data is used to augment a real-time image obtained from the camera. In at least some embodiments, the signal is provided to a wearable augmented reality device 100 such as a device of the type described above with reference to FIG. 1. In other embodiments, the signal may be provided to a smartphone, tablet or another type of augmented reality device.

The instruction provided at operation 760 may cause annotation data to be overlaid on the first document. To facilitate the overlaying, anchoring data and/or marker data may be included with the instruction. The marker data identifies a location associated with the first document and is used, by the augmented reality device, to influence the location of the annotation data in the viewport. That is, the marker data may be used to influence the location of the annotation data when the annotation data is displayed on an augmented reality device 100. The marker data may include anchor text, for example. The anchor text is, in some embodiments, the first parameter. The augmented reality device 100 may use the anchor text to identify a location at which the annotation data is to be displayed. This may allow the augmented reality device 100 to continue to display the annotation data when the image that is captured by the camera of the augmented reality device 100 changes. For example, the augmented reality device may look for defined text (e.g., such as "$500") in subsequently captured image data to select a location for display of the annotation data. For example, the annotation data may be displayed at a defined distance from the defined text.

The anchoring data that is included with the instruction to cause the annotation data to be overlaid may, for example, anchoring the annotation in a three dimensional viewing space to a physical object such as the first policy document. The anchoring data may allow the annotation data to maintain the same relative position to the physical object when an augmented reality device moves relative to the physical object. Such movement can be caused by movement of the augmented reality device or of the physical object (e.g., the first document) itself.

Figure 10:
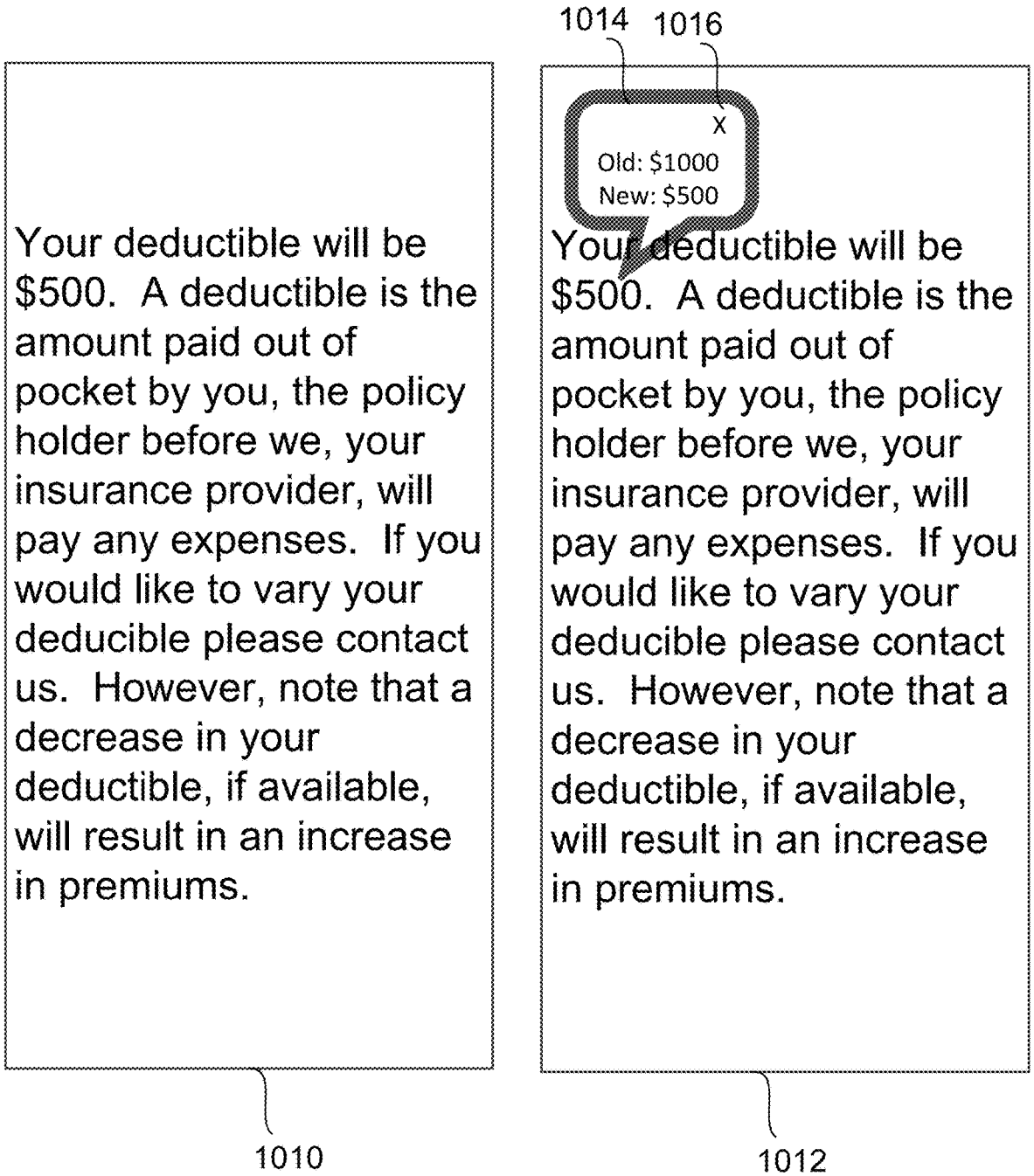
FIG. 10 illustrates example image data and a related augmented reality display.

Reference will now be made to FIG. 10 which includes an example of an augmented reality display 1012 that is generated based on an image 1010 represented by image data. The image 1010 includes text and a computing device 300 identifies a first parameter (i.e., $500) in the text using techniques described above. Annotation data 1014 (i.e., Old: $1000 New: $500) is generated by the computing device 300 based on the first parameter and a second parameter (i.e., $1000) and the annotation data 1014 is overlaid on the image to provide the augmented reality display 1012. In the example, a selectable option 1016 to hide or close the annotation data 1014 is also displayed. Upon receiving input representing selection of the selectable option 1016, the augmented reality device 100 may remove the annotation data 1014 from the augmented reality display 1012.

Figure 11:
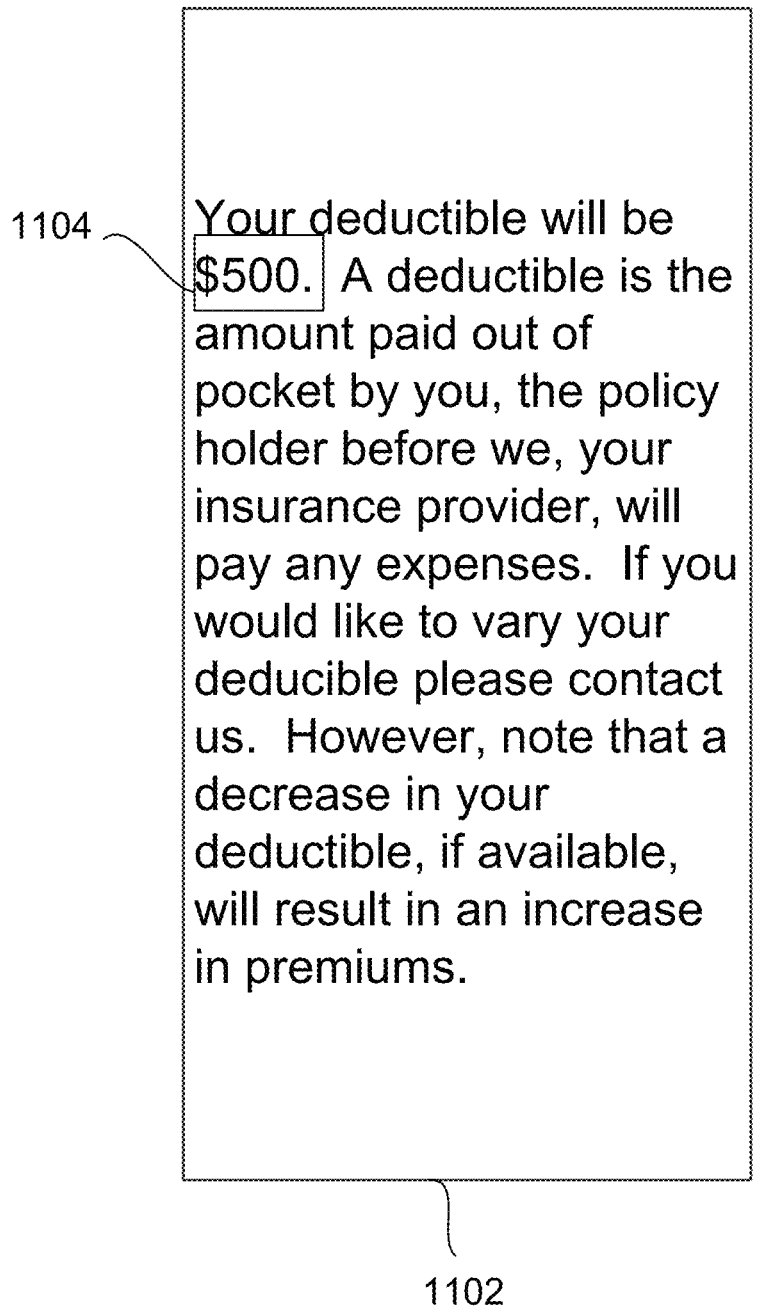
FIG. 11 illustrates a further example augmented reality display.

Reference will now be made to FIG. 11 which illustrates a further example of an augmented reality display 1102 that is generated based on an image 1010 represented by image data. After annotation data has been generated by the computing device 300, the viewport may be updated to include a selectable option 1104 to display the annotation data. For example, text associated with the annotation data (which may, for example, be the marker data and/or the first parameter) may be highlighted or otherwise modified to indicate that it is actionable. Upon selection of such text, the annotation data may be displayed. For example, upon selection of the actionable text, an augmented reality display 1012 of the type described above with reference to FIG. 10 may be displayed. Then, upon receiving a selection of the selectable option 1016 to hide or close the annotation data 1014, the augmented reality device 100 may remove the annotation data 1014 from the augmented reality display 1012 and revert back to the augmented reality display 1102 of FIG. 11.

The method 700 described above with reference to FIG. 7 made use of a second parameter that was stored in a memory. An example method 900 for adding the second parameter to the memory will now be described with reference to FIG. 9. Operations of the method 900 may be performed by a computing device such as the server 254. For example, a memory associated with such a computing device may store processor-executable instructions which adapt the computing device to perform the method 900 or portions of the method. For example, the annotation application 610 (FIG. 6) may include such instructions.

Accordingly, operations 910 and onward are performed by one or more processors of the computing device 300 (FIG. 4), such as for example the processor 310 (FIG. 4) of a suitably configured instance of the server 254 (FIG. 3), executing software such as, for example, a suitable instance of the annotation application 610 (FIG. 6).

Figure 9:
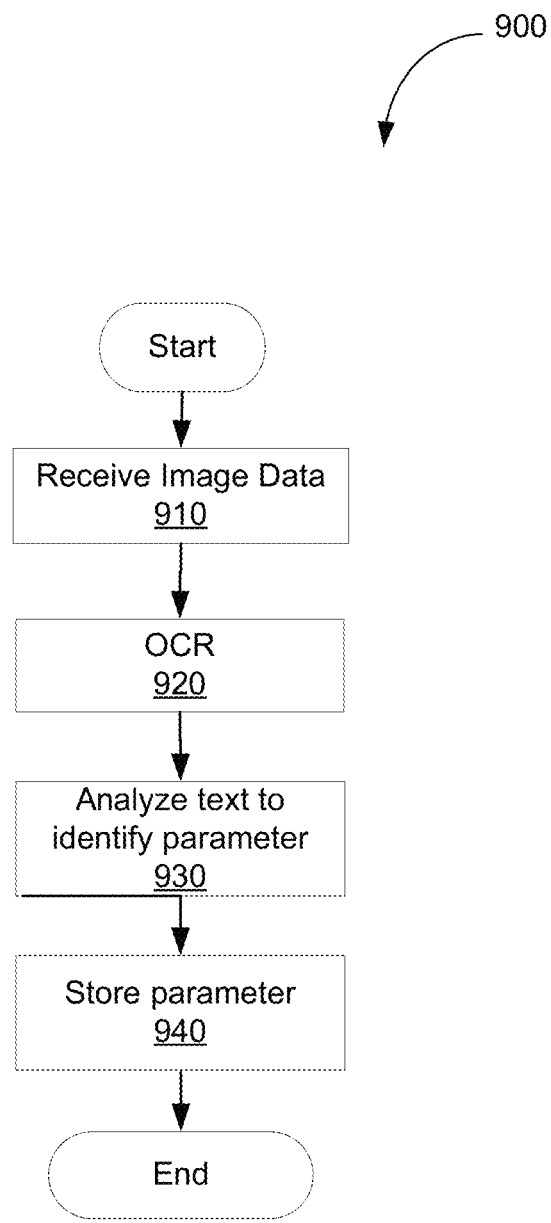
FIG. 9 is a flowchart of a method of obtaining and storing a parameter associated with a document.

The method 900 of FIG. 9 may be performed prior to the method 700 of FIG. 7 such that the second parameter is already stored when the method 700 of FIG. 7 is performed.

At operation 910, a signal that includes other image data is received from an augmented reality device. The other image data represents the second document and may be received similar to the manner by which the image data is received at operation 710 of the method 700 of FIG. 7.

At operation 920, the computing device 300 performs optical character recognition on the other image data to identify text in the second document. Operation 920 may be performed using the techniques described above with reference to operation 720.

At operation 930, the computing device 300 automatically analyzes the text in the second document based on stored classification data to identify the second parameter. Operation 930 may be performed using the techniques described above with reference to operation 730.

At operation 930, the computing device 300 stores the second parameter in a data store. The data store may, for example, be memory provided in or accessible to the server 254.

The method 900 may be performed to allow a user to effectively scan an old policy document. After the old policy document is scanned and processed using the method 900 of FIG. 9, the method 700 of FIG. 7 may be performed to provide an augmented reality view of a new policy document, which is augmented to provide annotations based on the old policy document.

While certain operations described above are indicated as being performed by the server 254, such operations may, instead by performed by the augmented reality device.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted. certain adaptations and modifications of the described embodiments can be made. Therefore, the above discussed embodiments are considered to be illustrative and not restrictive.

What is claimed is:

1. A computing device comprising:
a communications module;
a processor coupled to the communications module; and
a memory coupled to the processor, the memory storing processor-executable instructions which, when executed, configure the processor to:
receive, via the communications module, a signal comprising image data from a wearable augmented reality device having a viewport, the image data representing a first document;
perform optical character recognition on the image data to identify text in the first document;
automatically analyze the text based on stored classification data to identify a first parameter from the text in the first document;
compare the first parameter to a second parameter, the second parameter being obtained from a data store and being associated with a second document;
determine annotation data based on the comparison, the annotation data determined based on the first parameter and the second parameter; and
provide, to the wearable augmented reality device via the communications module, a signal that includes an instruction to cause the annotation data to be overlaid on the viewport displaying a real-time image of the first document, the instruction including marker data identifying a location associated with the first document and influencing a location of the annotation data in the viewport.

2. The computing device of claim 1, wherein analyzing the text includes: passing at least a portion of the text through a machine learning module trained to identify one or more parameters, the one or more parameters including the first parameter.

3. The computing device of claim 2, wherein analyzing the text further includes:
determining that the first document does not correspond to a known type, wherein passing at least a portion of the text through the machine learning module is performed in response to determining that the first document does not correspond to a known type.

4. The computing device of claim 1, wherein analyzing the text includes:
determining a type associated with the first document;
selecting a template for analysis of the text based on the type; and identify the first parameter based on the text and the template.

5. The computing device of claim 1, wherein determining the annotation data includes retrieving at least a portion of the annotation data from memory based on the comparison.

6. The computing device of claim 1, wherein the instruction causes the annotation data to be overlaid on the first document.

7. The computing device of claim 1, wherein the first document includes a policy document and wherein the second parameter is associated with a previous policy in effect.

8. The computing device of claim 1, wherein the second parameter represents text associated with prior version of the first document.

9. The computing device of claim 1, wherein comparing the first parameter to the second parameter comprises performing a mathematical operation on the first parameter and the second parameter.

10. The computing device of claim 9, wherein the mathematical operation includes subtraction.

11. The computing device of claim 1, wherein the annotation data includes the first parameter and the second parameter.

12. The computing device of claim 1, wherein the instructions further configure the processor to:
prior to automatically analyzing the text, parsing the image data into a plurality of segments by automatically evaluating a geometric structure of the first document represented in the image data.

13. The computing device of claim 1, wherein the instructions further configure the processor to, prior to receiving the signal comprising the image data representing the first document:
receive a signal comprising other image data from an augmented reality device, the other image data representing the second document;
perform optical character recognition on the other image data to identify text in the second document;
automatically analyze the text in the second document based on stored classification data to identify the second parameter; and
store the second parameter in the data store.

14. A processor-implemented method of causing annotation data to be overlaid on a viewport, the method comprising:
receiving a signal comprising image data from a wearable augmented reality device having the viewport, the image data representing a first document;
performing optical character recognition on the image data to identify text in the first document;
automatically analyzing the text based on stored classification data to identify a first parameter from the text in the first document;
comparing the first parameter to a second parameter, the second parameter being obtained from a data store and being associated with a second document;
determining annotation data based on the comparison, the annotation data determined based on the first parameter and the second parameter; and
providing, to the wearable augmented reality device, a signal that includes an instruction to cause the annotation data to be overlaid on the viewport displaying a real-time image of the first document, the instruction including marker data identifying a location associated with the first document and influencing a location of the annotation data in the viewport.

15. The method of claim 14, wherein analyzing the text includes:
passing at least a portion of the text through a machine learning module trained to identify one or more parameters, the one or more parameters including the first parameter.

16. The method of claim 15, further comprising:
determining that the first document does not correspond to a known type, wherein passing at least a portion of the text through the machine learning module is performed in response to determining that the first document does not correspond to a known type.

17. A non-transitory processor-readable storage medium comprising processor-executable instructions which, when executed, configure a processor to:
receive a signal comprising image data from a wearable augmented reality device having a viewport, the image data representing a first document;
perform optical character recognition on the image data to identify text in the first document;
automatically analyze the text based on stored classification data to identify a first parameter from the text in the first document;
compare the first parameter to a second parameter, the second parameter being obtained from a data store and being associated with a second document;
determine annotation data based on the comparison, the annotation data determined based on the first parameter and the second parameter; and
provide, to the wearable augmented reality device, a signal that includes an instruction to cause the annotation data to be overlaid on the viewport displaying a real-time image of the first document, the instruction including marker data identifying a location associated with the first document and influencing a location of the annotation data in the viewport.

* * * * *